United States Patent [19]

Ollus et al.

[11] Patent Number: 4,514,816
[45] Date of Patent: Apr. 30, 1985

[54] METHOD AND APPARATUS FOR THE CLASSIFICATION OF PIECE GOODS WHICH ARE IN A STATE OF MOTION

[75] Inventors: Martin Ollus; Esko Uotila; Björn Wahlström, all of Espoo; Esko Saukkonen, Helsinki; Pekka Malinen, Parainen; Immo Mäenpää, Littoinen, all of Finland

[73] Assignee: Oy Partek AB, Parainen, Finland

[21] Appl. No.: 518,974

[22] Filed: Aug. 1, 1983

Related U.S. Application Data

[63] Continuation-in-part of Ser. No. 179,780, Aug. 20, 1980, abandoned.

[30] Foreign Application Priority Data

Aug. 22, 1979 [FI] Finland ................................ 792621

[51] Int. Cl.³ .............................................. B07C 5/34
[52] U.S. Cl. ...................................... 364/478; 364/555
[58] Field of Search ............... 364/478, 507, 552, 554, 364/131, 132, 133, 555; 358/101, 107

[56] References Cited

U.S. PATENT DOCUMENTS

| | | | |
|---|---|---|---|
| 3,700,866 | 10/1972 | Taylor | 364/131 |
| 3,845,286 | 10/1974 | Aronstein et al. | 364/478 |
| 3,946,212 | 3/1976 | Nakao et al. | 364/552 |
| 4,132,314 | 1/1979 | Von Beckmann et al. | 364/478 |
| 4,136,396 | 1/1979 | Hansford | 364/552 |
| 4,166,541 | 9/1979 | Smith, Jr. | 364/507 |
| 4,170,306 | 10/1979 | Marshall et al. | 364/478 |
| 4,195,346 | 3/1980 | Schroder | 364/478 |
| 4,237,539 | 12/1980 | Piovoso et al. | 364/552 |
| 4,344,539 | 8/1982 | Lockett | 364/478 |

Primary Examiner—Gary Chin
Attorney, Agent, or Firm—Bucknam and Archer

[57] ABSTRACT

Randomly distributed objects of piece goods in a state of translatory movement are identified and classified on the basis of a physical property thereof. The travel path of the piece goods is observed with a detector scanning the path transversally and indicating the wanted physical property, said detector generating an electric signal proportional to the observed physical quantity at each spot of the scanning line, within the resolution capacity of the detector. Thereupon, the electric signals are treated continuously in real time and converted into binary key number groups belonging individually to each particular object in the scanning line. The key number groups are processed during the scanning recursively in classifying units nominated for each particular object during its passage past the detector, and the classification is carried out on the basis of these key number groups. Finally, upon completion of the passage of the object, the corresponding classifying unit is reset to perform the classification of a new object having arrived into the scanning line of the detector and being randomly situated therein.

10 Claims, 13 Drawing Figures a)

b)

METHOD AND APPARATUS FOR THE CLASSIFICATION OF PIECE GOODS WHICH ARE IN A STATE OF MOTION

This application is a continuation-in-part of application Ser. No. 179,780, filed Aug. 20, 1980, now abandoned.

BACKGROUND OF THE INVENTION

1. Field of the Invention

The present invention relates to a method and apparatus for the identification and classification, on the basis of a physical property, of randomly distributed piece goods which are in a state of translatory motion, wherein the path of travel of the piece goods is observed with a detector scanning the path transversally and indicating the wanted physical property, the said detector generating an electric signal proportional to the observed physical quantity at each spot of the scanning line, with the resolution capacity of the detector.

2. Description of the Prior Art

One of the most important needs of various fields of economic life is the classification of products which are manufactured or processed. The result and final aim of this classification is the mechanical separation of groups of pieces on the basis of the desired properties of the pieces, a procedure which can be called sorting. Classification takes place on the basis of either a measured physical quantity of mere observation.

Very commonly, classification is based on visual observation, wherein a person, on the basis of information visually obtained, decides to which class a piece good belongs, and thereafter carries out the necessary sorting. Usually piece goods travel as a continuous stream past the observer. Sorting is thus very strenuous work and cannot be performed continuously without adverse effects. One example is hand picking of crushed material in the ore-refining industry, wherein the desired objects are hand picked from crushed material on a conveyor belt. The criterion of classification may in this case be the color, size, or other visually observable physical property of the individual piece objects.

After video devices became known and reliable, TV cameras have been introduced for making optical observations. Depending on their structure, cameras are capable of detecting in the scanned area at least the same nuance differences as the human eye. The physical manifestation of the detection is an electric signal which is obtained from the camera and is proportional to the visual intensity of the scanned object. When the camera scans linearly the area to be described, the differences in intensity between the different spots on the scanning line are manifested analogously in the form of the said electric signals. Depending on the structure of the camera, i.e. in this case on its discriminating capacity, the distance between the points on the line can be expediently great or small. For example, in connection with a so-called image TV, this discriminating capacity has been adjusted to the discriminating capacity of the human eye, which is about 0.02 degrees. Camera tubes used for this purpose include Orthikon, Plumbikon, Vidikon, etc.

Other types of detectors may also be used, depending on the type of physical phenomenon which is being detected. Thus, for example, the temperatures of spots on the scanning line can be detected using an infrared detector, on their radioactive state with a Geiger counter. Separate detectors have been developed for each physical property. What they all have in common is that they generate an electric signal which is proportional to the intensity of the observed physical property and makes it possible to draw conclusions regarding the quality of the object.

The analog electric signals obtained from the detector can, suitably amplified and converted, be used directly for activating a meter or a plotter. In this case the measuring instrument may be calibrated to indicate the mean values, extreme values, or other required values of the observed physical property. The signals, suitably converted, may also be used directly for process control, in either analog or digital form. It is also known to analyse digitalized signals, in a computer in order to obtain information on the scanned object. In this case the computer is programmed to calculate the desired information on the basis of the input signals obtained from the detector and digitalized in a subsequent step. This is possible and known in the case of objects of detection which, within the detection area of the detector, appear more or less systematically, with small deviations as regards their positions and physical properties.

One example of the processing of information of the latter type is the classification of postal parcels and letters. The objects to be classified travel in this case on a conveyor belt past an optical detector or a TV camera as a continuous stream, at distances of approx. 2 cm from each other. The objects either have a certain code stamped on them in advance at a certain place and the detector indicates this code, or the detector indicates directly a postal code number typed at a certain place. In this case the detector is capable of generating electric signals with the aid of which a darker code or postal code number can be recognized against a lighter background.

In classification in which the objects appear randomly distributed on a conveyor belt or in which the objects cannot in advance be provided with appropriate codes for identification and they themselves do not include any systematic characteristics to facilitate indentification, the above system cannot be used. Such classification needs include the classification of natural products such as crushed rock and ore, root vegetables, timber, foodstuffs to be preserved, and other unrefined products. In such cases the classification apparatus must meet the following requirements:

In the absence of codes or systematic characteristics to facilitate identification, it is necessary that the identification can be performed on the basis of identification criteria which are randomly distributed. For example, in the sorting of mail, a method is so far not known which could identify an object on the basis of a handwritten postal code number.

Since the physical properties used for identifying the objects are of different types, i.e. the identification criteria can vary by their basic character, the apparatus must be capable of "learning". This means that it must be capable of determining the classification criteria of an object on the basis of information obtained from reference objects previously run through the apparatus. In the sorting of mail, the apparatus is capable of identifying object only on the basis of a certain code or machine-typed postal number. The same apparatus cannot easily be adjusted to identify an object on the basis of its size or color, for example.

Owing to the random distribution of the objects on the conveyor belt, the apparatus must be capable of identifying each object as a whole and to process the data obtained from the detector within the time period that the object resides on the scanning line of the detector, i.e. in the real time. After the object has passed the detector, the processing unit of the apparatus now reset must be immediately ready to process a new object randomly situated on the conveyor belt after it arrives into the scanning area of the detector.

In the sorting of mail, the objects are situated in a pre-organized single row. The apparatus is capable of identifying only a code or postal code number in a certain place. Furthermore, the apparatus need not shift its scan from one place to another in the transversal direction of the conveyor belt. If it is desired to process several rows of objects, there has to be a separate apparatus for each row.

As regards the classification of crushed material in the ore-refining industry by video devices, the state of the art is primarily illustrated by Canadian Pat. No. 923,601. According to this patent, randomly oriented objects are illuminated on their path of travel by a laser beam scanning across the path of travel, and the reflection of the laser beam from the object surfaces is received by a photomultiplier tube. The property of the light reflected is proportional to the property of the reflecting surface. In the detector, the light signals are converted, by known means, to analog electric signals, which thus contain information regarding the illuminated objects. In the subsequent electronic devices, the electric signals are digitalized in a known manner to form one-bit binary key numbers describing the objects.

The known method is characterized in that the path of travel scanned by the detector is divided electronically into fictive flow channels in the travel direction and that each channel has its own fixed electronic devices. Since the objective of i.e. the removal of unacceptable specimens from a heterogenous flow of objects, the number of fictive flow channels, i.e. electronic channels, correspond to the number of rejecting means. Consequently the classification is inaccurate, because the electronic system of each channel summarizes two or more objects on the same scanning line which means that all of them are rejected or accepted as a whole, though some of them may differ.

Another disadvantage consists of the fact that the system is not self-learning, i.e. it is not capable of forming, on the basis of reference objects run past the detector, the criteria necessary for the classification. The class criteria therefore have to be set into the system manually.

SUMMARY OF THE INVENTION

It is an object of the present invention provide an improved method for the identification and classification of randomly distributed objects of piece goods and the new method comprises observing the travel path of the piece goods with a detector scanning the path transversally and indicating a distinctive physical property in question, said detector generating an electric signal proportional to with the physical quantity at each spot of the scanning line within the resolution capacity of the detector, treating said electric signals continously in real time and converting the same into binary key number groups belonging individually to each particular object in the scanning line of the detector, processing the key number groups during the scanning recursively in a classifying unit nominated for each particular piece during its passage past the detector, in order to carry out the classification on the basis of the key number group, and releasing upon completion of the passage, the corresponding classifying unit to perform the classification of a new object having arrived in the scanning line of the detector and being randomly situated therein.

The system of the present invention can be used for advancing the above aims and for minimizing the disadvantages.

The higher efficiency of the present invention, as compared with previously existing systems, is primarily based on a new type of division of tasks between the processors. In the existing systems, the analysing is carried out analogously, or the same computer or same computers analyse all the detected data irrespectively of the quantity and quality of the data. For example, if there are several objects of interest in the detection zone, the same computer processes each object successively. Instead, according to the present invention, the objects are divided among several processors in such a manner that there is a separate processor nominated for each particular object to be processed. The number of processors in operation thus depends on the number of objects on the scanning line. The number of objects to be handled in parallel can be increased by adding parallel processors. Furthermore, the efficiency and rapidity of the invention is based on the bus structure of the system. It should be pointed out that the price of the system remains quite moderate owing to the low prices of current processors.

BRIEF DESCRIPTION OF THE DRAWINGS

FIG. 12 illustrates the Euclidic distance.

DESCRIPTION OF THE PREFERRED EMBODIMENTS

Figure 1:
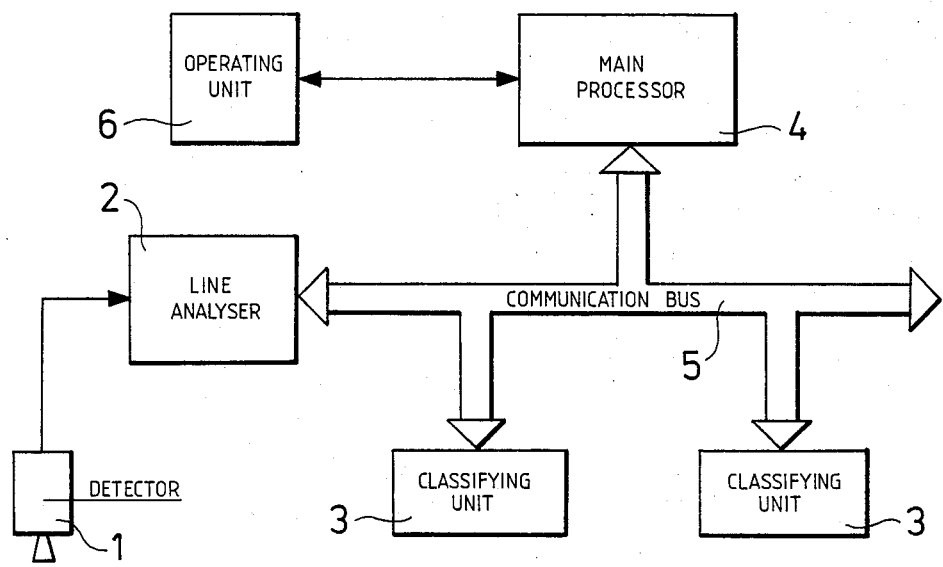
FIG. 1 is a block diagram of the system according to the invention.

In FIG. 1, the reference numerals are:

1. Detector, which may be of a known type for the detection of a wanted physical property. The detector generates analog electric signals in a known manner.

2. Line analyser, which in real time analyses the electrical signals generated by the detector for each scanning line; from these signals, key numbers are formed to be sent in digital form to the classifying unit.

3. Classifying units containing microprocessors, which carry out the classification of a piece on the basis of the digital information obtained from the line analyser. There can be several of them of the same type, but at least as many as the highest number of pieces appearing on the scanning line of the detector.

4. Main processor, which collects the results obtained from the classifying units and processes them for further measures. The main processor also tells the class criteria to the classifying units.

5. Bus for communication between the processors and between the processors and the line analyser.

6. Operating unit, through which the operation of the system is controlled and which indicates any disturbances produced in it. Classification criteria which need not be obtained with the help of reference objects passing before the detector may also be fed manually into this unit.

The system according to the invention operates as follows:

When the randomly distributed piece goods pass the detector 1 on a path of travel of predetermined width, the detector detects the objects in its scanning area, making regularly repeated scans across the path of travel. Hereinafter, one such scan across the path of travel is called 'scanning line' or just 'line'. The initial and final spots on the line and the length of the scan in time are adjusted by known methods in accordance with the detector structure and the width and travel speed of the piece goods. In terms of time, the length of the line is in the order of a millisecond, but long time intervals are also possible.

During each scan the detector detects the wanted physical properties of the objects on the line at that moment. The detection takes place at spots, the number of detection spots being dependent on the resolution capacity of the detector. The detector converts, by known methods, the intensity of the physical state detected at each detection spot on the line into a corresponding electric signal. If, for example, the detection is based on the arbitrarily variable blackness/whiteness of the objects, as compared with the standard tone of the background, the detector forms an electric signal proportional to this difference in tone at each spot on the line. In this case the detector may be, for example, a photodiode camera. Correspondingly, other detector systems scanning continuously and in lines are used for producing electric signals proportional to the wanted physical property.

The analyser 2 processes, electronically in real time, the signals coming from the detector 1, and during each scan, $N > 1$ binary key numbers are formed for each particular object in the scanned area on the basis of the information obtained from the detection spots on the line. The first two numbers of these key number groups may for example indicate the margin positions of the object on the line.

The other key numbers may indicate the physical state of the detection spots between the margins and belonging to the same object, in the form of maximum values, mean values, variance or other appropriate values. Hereinafter, any key number group containing $N > 1$ binary key numbers formed by the line analyser is called the result of detection.

The key numbers are formed using separate printed circuit boards. In the line analyser 2 the key numbers are formed according to known principles by an appropriate selection of the circuit board components and their mutual circuitry, for example, on the basis of the integrated charge of the capacitors and the thus obtained precise instantaneous electric quantities. The order of the result of detection, and the order of output to the following processing unit, is determined by the location of the circuit boards in the line analyser. The circuit boards can be replaced easily, and so the features can be changed rapidly according to the need.

The line analyser begins the measurement by first forming the key number of the front margin of the object on the line. Thereafter follows the detection of the intermediate spots and finally the detection of the trailing margin of the same object. After the line analyser has verified that the trailing margin has also been measured, there is an immediate transfer of the result of detection to the output buffer of bus 5, and simultaneously the line analyser also sets the "results-of-detection-ready" signal to the bus.

Since the system according to the invention is self-learning, the further processing of the results of detection from the above-mentioned state can take place in two different ways. The further states are the teaching stage and the classification stage, the former being described first.

TEACHING STAGE

The "teaching-stage" state is set by means of the operating unit 6. This state means that a certain number of reference objects are run past the detector, and results of detection are obtained from these in the manner explained above. Also, the number of the reference objects in each reference batch of the same class is set by the operating unit, as well as the number of these reference batches or classes.

When the results of detection are ready in the output buffer of the bus 5 and the information regarding this has been sent to the bus in the manner explained above, the main processor 4 decides to which classifying unit 3 the results of detection are transferred. This takes place on the basis of the address of the classifying units. For the identification of the classifying units, each of them has its own binary key, or address. When the system is being started, the main processor 4 sets the addresses of all the classifying units into the memory. The first object piece of the piece goods having arrived into the scanned area of the detector, and the result of detection being immediately transferred to the output buffer of the said bus 5, the main processor assigns the classification task to the first waiting classifying unit. The processing of the object arriving next in the scanned area is assigned to the second waiting classifying unit, etc.

The classifying unit which has received the task reads and stores in its memory the result of detection available in the output buffer, and tells via bus 5 to the main processor 4 that it has accepted the object. The procedure is similar regarding the results of detection for the other objects of the piece goods in the line at the same moment and regarding the classifying unit nominated for each such particular object in the same manner.

As an object travels continuously past the detector and as new lines are thus formed continuously, and as corresponding results of detection are continuously transferred to the output buffer of the bus 5, each classifying unit 3 directly, without the transmission of the main processor 4, selects from the output buffer those results of detection which belong to it. This happens on the basis of the key numbers of the margins of the object and their continuity. It is a prerequisite in this case that the objects do not touch each other and that the intensity represented by the background deviates sufficiently from the intensity of the objects. When a classifying unit identifies an object as its own the unit again tells to the main processor 4, via the bus 5, that it has identified the object, for further processing of the new results of detection.

As the results of detection are thus transferred to each classifying unit during the passage of the objects, the unit recursively computes and stores in its memory the values obtained on the basis of the results of detection. This continues until the entire object has passed the detector and no more results of measurement belonging to it are formed, i.e. when the subsequent results of detection are not any longer accepted by the classifying unit. Having verified this, the classifying unit remains waiting for permission to forward the computed results to the main processor.

The main processor sends periodically an inquiry to the classifying units. When a classification receives the inquiry, it forwards the results to the main processor via the bus, and the classifying unit returns to its initial state. Thereafter the main processor sets the reset classifying unit in last position in the waiting line mentioned above, to wait for its following classification task. This occurs for each classifying unit when there are no more results of detection. When a new object arrives into the detector line the main processor verifies that no classifying unit has taken over this object and then assigns the classification of this object as a task to the classifying unit which is first in the waiting line.

As the operation continues in the manner described above, the main processor 4 registers the number of objects which have passed the detector. When this number is equal to the number set by the operating unit 6, the main processor 4 no longer accepts data from the classifying units and considers that the batch of reference objects has traveled past the detector. On the basis of the data obtained from the classifying units, the main processor 4 now begins to compute the class vectors, i.e. the final binary key numbers which, on the basis of the statistical data obtained from the results of detection, best describe the class characteristics. These class vectors may also be called class criteria, and computed during the state of teaching individually for each particular object by the classification units 3 and for the whole batch of reference objects by the main processor 4, they represent the same mathematical configurations, i.e. features, as produced by the line analyser 2 for each scan with the aid of tis replaceable circuit boards, i.e. maximum value, mean values, variance etc., for the observed intensity. It may also be said, that the line analyser 2 produces the features in transverse direction, each classification unit 3 in flow direction and that main processor 4 computes them for the whole batch of reference objects, thus obtaining the characteristic called class vector. See further under "class vectors" and "mean values and variance". When the main processor has verified that the number of reference objects set by the operating unit 6 has been used as a basis for computing the class vectors, it transfers the final results to its output register.

A corresponding operation proceeds for forming of the class vectors of the next class on the basis of the reference objects of this class. Before the processing of the reference objects of a new class, the computing system but not the result memories, resets in its initial state, and so the new reference object batches can be placed successively on the path of travel.

After the main processor 4 has verified that the number of classes set by the operating unit 6 has been reached in processing, and thus the corresponding number of class vectors has been computed and transferred to its output register, all class vectors are transferred to the reference memory of each classifying unit 3. Thereafter the system is ready for the actual classification, i.e. the teaching stage has been completed.

When necessary, the key numbers corresponding to the said class vectors can also be transferred by means of the operating unit 6 directly to the reference memory of the classifying units 3, without the use of reference objects and the class vectors obtained on the basis of the reference objects in the manner described above.

CLASSIFYING STAGE

The "classifying-stage" state is set by means of the operating unit 6. This state means that the actual piece goods to be classified are run past the detector, the number and distribution of the objects on the path of travel being random. The only prerequisite is that the objects do not touch each other.

The operation and interaction of the processing units take place during this stage according to exactly the same principles as during the teaching stage. The only exception is that during this stage the main processor 4 does not compute the said class vectors, since the composition of the piece goods is now of random quality, and the criteria necessary for their classification have been fed to the reference memory of the classifying units during the teaching stage. Thus a classifying unit 3, nominated by the main processor 4 for a particular object during its scanning as a whole, reads and stores the outputs of the line analyser 2 via bus 5. The scanning of the whole object having ended the classification unit 3 computes a binary characteristic for this same object, and compares the result in real time to the classification criteria (=class vectors) stored in its reference memory, passing then the result of comparison to the main processor 4 via bus 5 for a rejection or acceptance decision.

After the classification, the data regarding the class is transferred to the output register of the classifying unit 3 and from there further via the bus 5 to the main processor 4 in the manner described regarding the teaching stage. Thereafter the classifying unit returns to its initial state and is set in the waiting line determined by the main processor as described above.

Having received the data regarding the class of an object from the classifying unit temporarily nominated for the object, the main processor 4 gives an order for further functions. Such a function may be, for example, the removal of the object from the path of travel after it has arrived at a predetermined point.

The principles of operation of the classifier according to the invention have been described above. The actual advantage over the known state of the art is the fact that a separate classifying unit has been nominated during the scanning for each particular object of piece goods, randomly situated on the path of travel, and after storing the classification criteria obtained with the aid of reference objects, the classifying unit itself is capable of carrying out the necessary classification and is thereafter free to carry out the classification of the next randomly situated object.

The expediency and reliability of the classification method of the invention have been verified with a prototype. This prototype is described below with reference to FIGS. 2 and 3.

Figure 3:
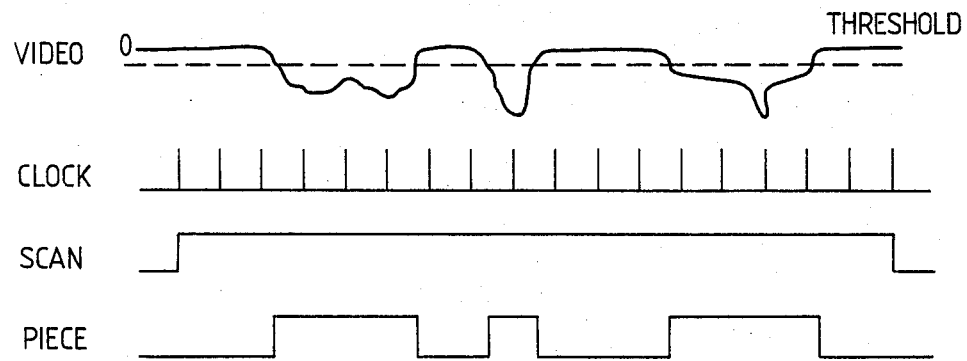
FIG. 3 depicts curve forms relating to the description of FIG. 2.
Figure 2:
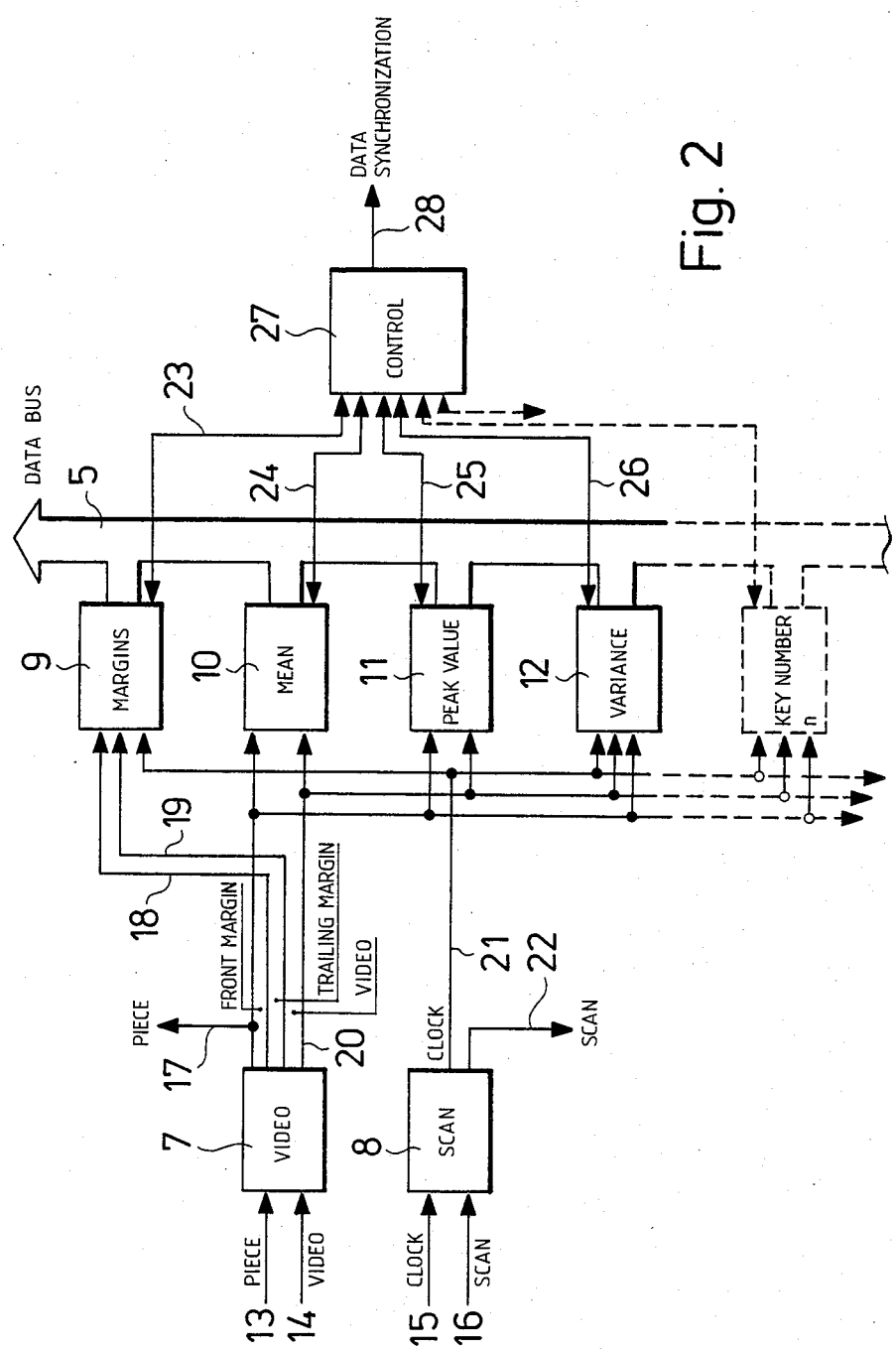
FIG. 2 is a block diagram of a line analyser used in the invention as shown in FIG. 1, and the system, in greater detail.

FIG. 2 is a more detailed block diagram of the analyser circuitry. The analyser receives signals 13, 14, 15 and 16 from the camera. The meanings of these signals are shown in FIG. 3. The VIDEO signal is the analog signal, received from the detector, proportional to the photointensity of the object. The PIECE signal is the digitalized video signal with a threshold just above zero. The threshold values can be set in a manner known per se. The SCAN signal indicates when the scan is on, i.e. the signal is '0' between the scans.

In block 7, the video signal of the camera is amplified (20). Pulses 18 and 19 are formed at the front and trailing margins of the piece. Signal 17 is a buffered PIECE signal sent to the classifying units.

Block 8 synchronizes the camera and the analyser with the clock 15. Signal 22 indicates to the classifying units when the scan is on.

Block 9 indicates the position of the front and trailing margins of the object within the scanned area. These values are stored in the buffers to wait for the transfer to the classifying unit via bus 5.

Block 10 integrates the mean lightness of the object from the video signal 20. Signal 17 indicates the integrating time. The analogously formed integral is converted into digital for and stored in the buffer to wait for the transfer to the classifying unit via bus 5.

Block 11 indicates the maximum value of the video signal for each object and line and converts it into digital form. The result is stored in the buffer.

Block 12 peforms the variance of the video signal for each particular object and line analogously. The variance converted into digital form is stored in the buffer.

The current prototype has the key number blocks listed above (blocks 9–12). As can be seen in FIG. 2, other key number blocks possibly significant for the features can be added to the analyser.

When the key number of each block is ready in the buffer, the block sends the "data ready" signal to the control logic 27 (by signals 23–26). When the control logic has received the "data ready" signals from all blocks, it generates the control pulses 28 to transfer the data to the classifying units and opens each output buffer alternately to the data bus 5.

In practical experiments, a rotating roller has been used as a travel path of the piece goods; the number of revolutions of this roller can be adjusted without steps between peripheral velocities of 0 and 5 m/s. The diameter of the roller is 850 mm and its length 1200 mm.

The test objects to be detected are attached at arbitrary points on the black painted surface of the roller.

Since the need for the classifier is primarily based on the classification of crushed limestone, in the first and current stage the prototype system has been fitted to produce a classification on the basis of the darkness/lightness difference between objects of piece goods. Thus, during this stage the detector used is a photodiode camera, Reticon LC 100, which is at a distance of about 2 m from the roller and, positioned on its (=path of travel) center line, detects the test objects attached to the suitably illuminated surface of the roller. The scanning time of the camera, i.e. the length of time of the line, and the return time can be adjusted separately. Their total minimum is approx. 1 ms.

The number of key numbers formed by the line analyser 2 is N=5, and these key numbers indicate, for each test object in the line, the photointensity of its surface in relation to the black background of the roller. Thus, in the prototype system, the intensity of reflected light appearing within the detection area of the camera is detected, the respective intensity of the background serving as the reference. The camera produces electric signals. In the line analyser the signals are converted into the said binary key numbers, which indicate, as results of the detection, the position of the front margin, the position of the trailing margin, the maximum value of intensity, the mean value of intensity, and the variance of intensity for each test object. These key numbers are formed as they arrive from the camera during the scan, i.e. in real time.

In the prototype there are 3 classifying units, of which each can be programmed to discriminate two classes.

Since the prototype is newly completed, there has not yet been sufficient time to use it for systematic experiments in order to present quantitative results of its expediency. However, a few qualitative examples of the results obtained so far are presented below.

EXAMPLE 1

The capacity of the prototype system to form class criteria of the two classes taken into consideration in the visually most obvious case was tested using white limestone and considerably darker waste rock. All pieces of rock were taken at random from the silos into which they had been transferred on the basis of a sorting performed manually and visually. Two runs were carried out, one of them with only limestone and the other one with only waste rock, the system being in the state of learning.

In each run, the pieces of a rock batch, suitable for the number of the classifying units, were placed in arbitrary positions on the roller. The roller was illuminated with two halogen lamps.

It was observed that the class criteria of each type of rock had passed to the reference memory of each classifying unit during one cycle, i.e. within the time that the batches of rocks had completely passed the detector, i.e. in real time.

It was also observed that in this obvious case the mean value of the intensity of the reflected light was alone sufficient for forming the desired class criteria, i.e. the mean value alone produced the same precision of identification as visually performed classification. However, the variation of the maximum and variance values gave reason to assume that mechanically performed classification will result in more precise classification.

EXAMPLE 2

The class criteria formed according to Example 1 were retained in the reference memory of the classifying units and a new batch of rocks taken randomly from the same silos was placed on the roller. This time, limestone and waste rock were run together within the same time, the system being in the classifying state.

It was observed that the classification was performed in real time and that the quality of the accepted pieces of rock, i.e. limestone, was better even than the quality obtained by hand picking. The number of rejects was, in other words, relatively higher. It was also observed that the mean value alone sufficed for producing this result.

EXAMPLE 3

In order to verify the capacity of the system in another extreme case, i.e. in a flow in which all pieces are "white" but of different usable quality, two runs according to Example 1 were carried out, one with pure limestone and the other with pure wollanstonite. Both rocks are "white", and not easily distinguishable to the unaccustomed eye.

It was observed that the class criteria had passed in accordance with Example 1. It was also observed that the mean value alone was not sufficient for determining the desired class.

EXAMPLE 4

The class criteria formed according to Example 3 were retained in the reference memory of the classifying units and a new batch of limestone and wollanstonite was run together in accordance with Example 2.

It was observed that mechanical classification produced a more even quality than visual classification of the same batch. It was also observed that the variance values were of decisive importance in the classification of the rock in order to concentrate the desired usable properties.

THE SOFTWARE OF THE MAIN PROCESSOR (4)

THE MONITOR PROGRAM

The monitor program SYSMON acts as a link between the user and the system. It contains a command interpreter, which interprets the commands given by the user from the console. If the command is legal, the monitor program will start the corresponding function. The monitor program also contains the base of the system program. After the interrupts and the different routines the control is transferred to the monitor program.

There are two types of interrupts, the console interrupt and the camera interrupt. The command interpreter of the monitor program acts with the interrupt principle, i.e. a push of the console button results in an interrupt under normal conditions. During some discussions the console interrupt is anyway forbidden, whereby the push of a button will not wake up the command interpreter. The camera will always cause an interrupt after every sweep, if this interrupt is allowed. The interrupt will start the real-time routines of the system. If the system is not in a sort or in a learn mode, the camera interrupts are forbidden.

Figure 4:
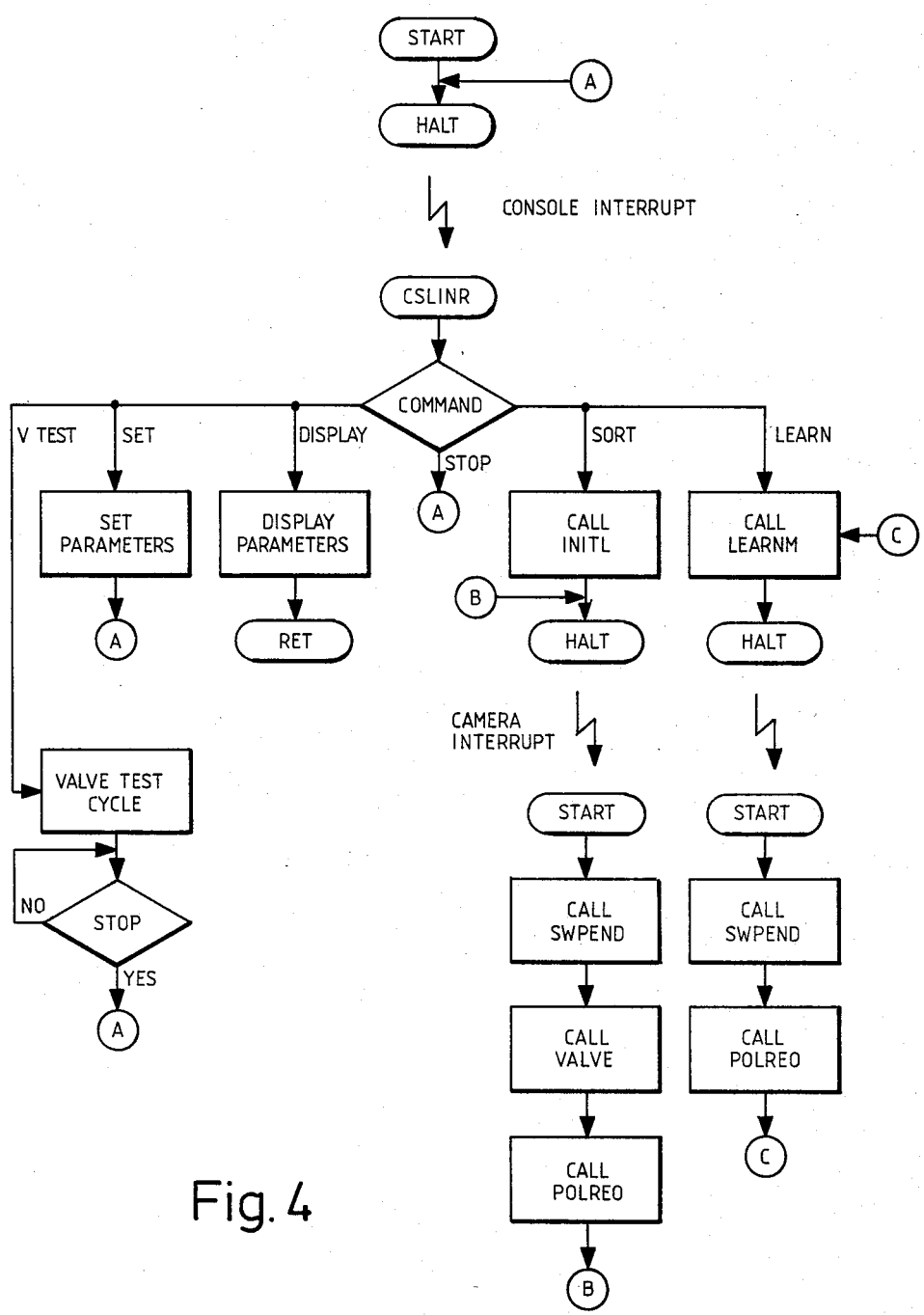
FIG. 4 is an operating diagram of the monitor program.

In FIG. 4 there is the operating diagram of the monitor program. When the system is started, the program sets the interrupt mask in that way, that only the console interrupt is allowed, and stops at the HLT-command. After that the system is ready to have the user commands. This readiness it announces by outputing the ready sign "*". Until now there are 6 commands, the SORT-, STOP-, LEARN-, DISPLAY-, SET- and VTEST-commands.

The SO(RT)-command will put the system into the sort mode (the command interpreter will interpret only the 2 first characters of the command). Before the start of the operation the system is initialized into the start state, after which the processor stops at the HLT-command (note that A, B and C are different states). Then the camera interrupt is allowed. The camera interrupt causes the control to jump to the SWPEND-program, that performs special real-time routines. After that the VALVE-program searches for new sort results, and if it finds any, the ventile file is updated. The POLREQ polls if there are any sort results ready in the classification unit.

The ST(OP)-command stops every operation, and the system stops at the HLT command. Only the console interrupts are allowed.

The LE(ARN)-command puts the system into the learn mode. LEARNM asks for the necessary learn parameters and initializes the system into a learn mode. The camera interrupt wakes up the SWPEND routine, after which the system polls the results from the classificaton unit. LEARNM controls when the learning is finnished, after which the system returns to the start state A.

The D(ISPLAY)-command outputs the class vectors. The output format is:

CLASS 1 xx xx xx

CLASS 2 xx xx xx

The positions of the vector are the minimum value, the mean value and the peak value. The values are displayed as hexadecimal numbers.

With the SE(T)-command the class vectors can be set manually. The output format is the same as by the DISPLAY-command. The punctuation mark could be either "", ",", or "CR". If a forbidden mark is given from the console, the system outputs a "#" and waits for a new mark. The "CR" finishes the vector. After the vectors have been written into the classification unit, the system returns to the start state.

The V(TEST)-command starts the test program of the ventiles. The program stays in the test loop until it is given a STOP-command. Every ventile is opened and shut for approximately 1 s with a period of 25 Hz.

THE INITIALIZING PROGRAM

Figure 5:
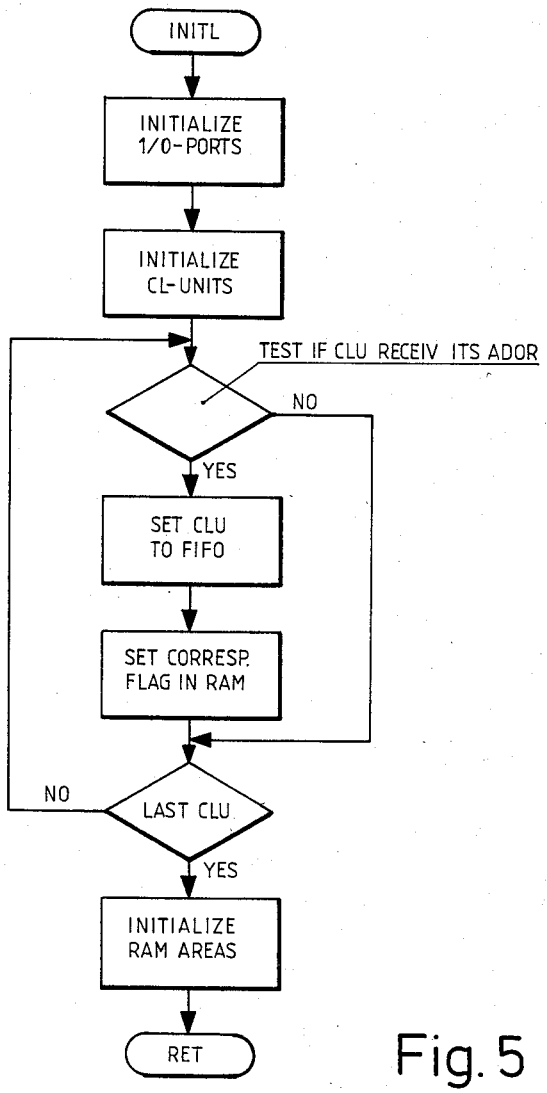
FIG. 5 is an operating diagram of the initializing program.

Before the operation of the system can be started, the system has to be moved to its start state, i.e., it has to be initialized. This will be done by the program INITL, which is called for when needed. The operation diagram of the program is shown in FIG. 5. First, the program initializes the I/O-ports of the main processor. After that, it will send a reset-pulse to the classification unit, which again puts these in there start state.

The maximum number of the classifiction units in the system is 256. In most practical applications only a few of these are needed, for example 10 units. The system has to know how many units there are at its disposal. For this reason the INITL-program checks from every address of the classification unit if there is a classification unit present. The classification unit answers the request by sending its address to the address line. In this way also defective units will be sorted out. If the classification unit is present, it will be placed into the FIFO-register to wait for its task. Moreover, data telling that the unit in question is present will be put into the state table (the corresponding byte in the state table is set to "1").

Finally the program initializes the RAM-memory areas into their start values.

THE SWPEND PROGRAM

Figure 6:
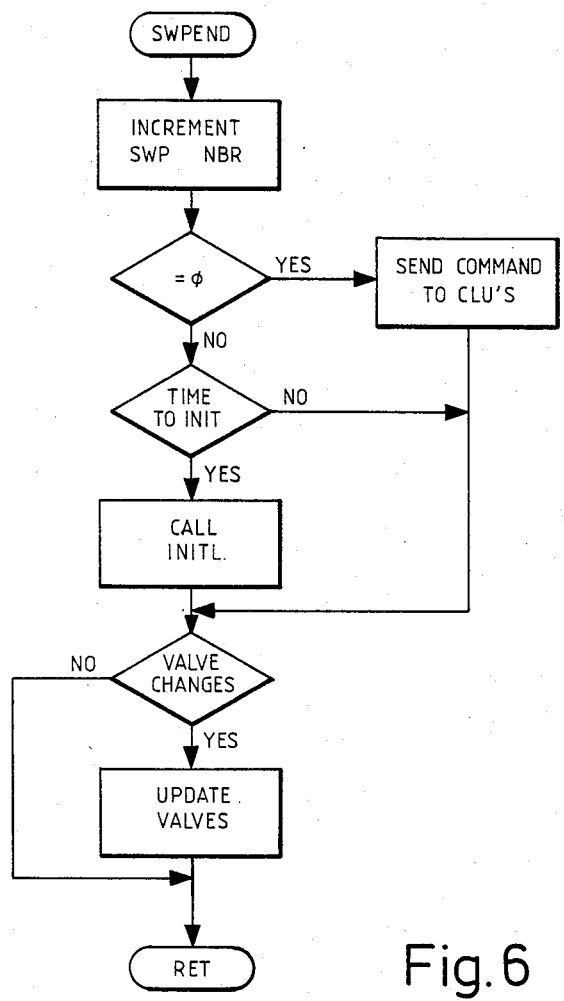
FIG. 6 shows the SWPEND program.

The SWPEND-program is a program which is bound to real-time, and which will be waked up at the end of every sweep. The program carries out the necessary real-time routines to keep the system working (FIG. 6). In the beginning, the program increments the sweep counter, i.e. it updates the y-coordinate of the line. If the sweep counter =0, a command "zero the sweep number" is sent to the classification units.

This command synchronizes the classification units (3) to the same coordinate system as the main processor (4). The system is initialized at fixed time intervalls so that, if one or some of the classification units have been locked into a certain state caused by disturbance or other reasons, they will not participate in the operation of the system. The initialize period can be set to the parameter ITIME SWPEND in the program (for instance 35 min). The SWPEND-program checks when it is time to initialize the system and carries it out.

After this, the program checks from the change table of the ventiles, whether there are ventiles to update by the corresponding sweep number. If there are, the updating will be carried out by calling for the corresponding subroutine.

Figure 7:
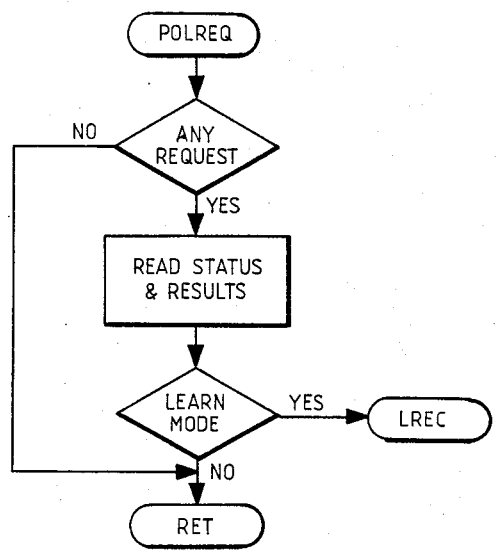
FIG. 7 illustrates the poll routine.

The POLREC-routine asks the classification units, if they have any messages for the main processor (FIG. 7). The polling is chained from one classification unit to another so that the enquiry stops at the first unit in the chain that has a message ready. The POLREC-routine reads five data bytes, of which the first one is the state word of the classification unit. The state word tells whether it is a matter of classification results or the measuring results of the learn mode. Still a possible malfunction appears from the state word.

THE LEARN PROGRAM

Figure 8:
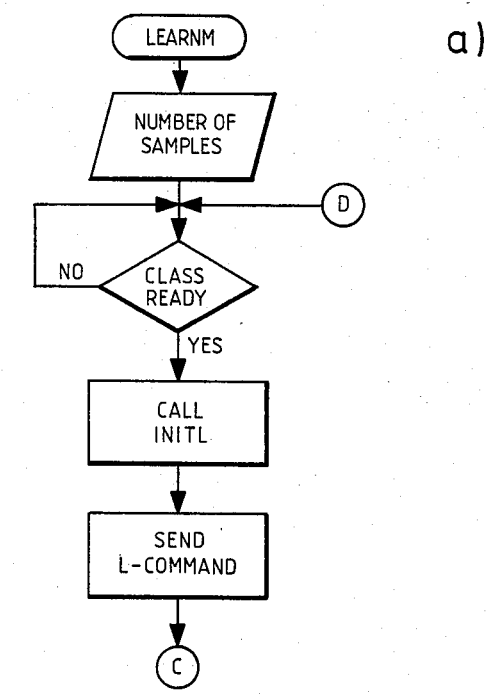
FIG. 8 illustrates (a) the start and (b) the learn routine of the learn program.
Figure 8:
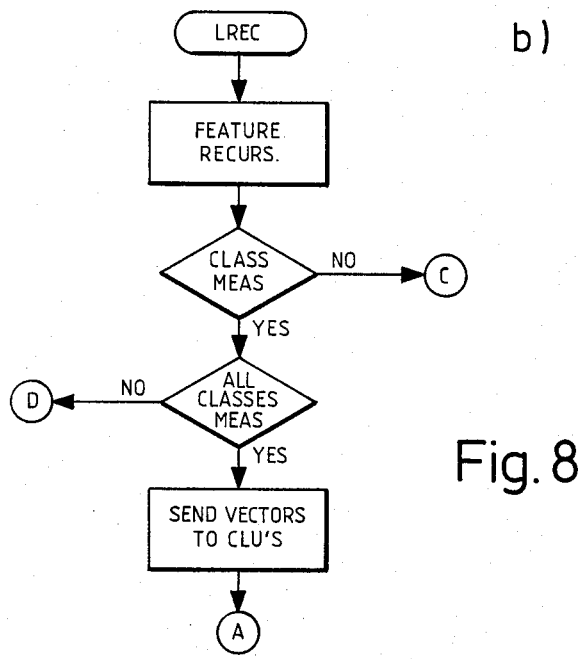

The LEARN-command will cause a jump to the learn program LEARNM (FIG. 8). First the program asks for the size of the set of learn samples by outputing.

NUMBERS OF SAMPLES

This is answered by giving the number of the samples in decimal. The largest number that the system accepts is 65535 ($2^{16}$). After pushing the "CR"-button the program outputs

CLASS 1 which means that the program waits for a message about when the samples are to be taken. This is done by answering CR.

After that, the program initializes the system. The classification units get the data from the learn mode with the MESSAGE-command, the dataword of which gets the value 1. After this, the program stops in the "camera interrupt allowed"-state, and the system waits for an interrupt.

When the POLREC-routine has read the results from the classification unit, it notices from the state word, that it is a matter of learn results. This causes a jump to the LREC-routine, which recursively calculates the statistical mean values of the measure results, i.e. the class-vectors. If the set of samples belonging to that class has been measured, the program outputs

CLASS 2 and waits for the samples of class 2. CR will cause the corresponding operation for the samples of class 2. When both class-vectors have been measured, the program sends these to the classification units, after which it outputs the ready sign "*". The system is ready for the sort mode.

The class, that is wished to be blown away, is to be learned first, i.e. as CLASS 1. The class vectors received as a result of the learning are to be shown with the DISPLAY-command.

THE SOFTWARE OF THE CLASSIFICATION UNIT

THE CONNECTION BETWEEN THE SOFTWARE AND THE HARDWARE

The task of the classification unit is to gather measuring data of one stone at a time and to classify the stone according to this data. The classification unit gets the task from the main processor, which keeps up a file containing vacant classification units. When the classification unit has done the classification, it will be vacant for new tasks. The main processor communicates with the classification unit along the command bus, i.e. by sending the wanted command, the classification unit will do the wanted operation. The data transfer between the main processor and the classification units is carried out along the data bus.

The software carries out the tasks of the classification unit together with the hardware. The program is controlled by the following outside signals.
RESET: the processor in its start state
INT: interrupt
SWEEP ON: T1-input, tells that the sweep is finished
T0: the readiness of the main processor in data transfer
C0, C1, C2: coded commands
ORDY: the readiness of fifo
The program acts on the hardware by the signals
RELA: deallocate the address lines
STBY: ready to recognize ones own stone
PREQ: ready to answer a question
SO: moves data in fifo
OE: output enable of fifo
RDEN: read enable (classification unit—main processor)
WREN: write enable
TPULSE: timer pulse
CE: chip enable of the RAM-circuit
IO/M: IO/memory control of the RAM-circuit The classification units are connected to a common data bus (5) between the main processor and the classification units. The bus is buffered and the readiness of the main processor is read through the T0 test input. The data from the analysator is moved along a separate databus to the FIFO-register of the classification unit, from where the classification unit reads it into its memory after the interrupt.

THE START STATE

The classification unit is set to the start state after the reset and after printing the sort results for every stone. For the initializing time, interrupts are forbidden. The I/O-ports P1 and P2 are set into following states

| bit | explanation | start state |
|---|---|---|
| port P1 | | |
| 0 | SO | 1 |
| 1 | OE/ | 0 |
| 2 | RDEN | 1 |
| 3 | WREN | 1 |
| 4 | T.PULSE | 1 |
| 5 | RELA | 1 |
| 6 | STBY | 1 |
| 7 | PREQ | 1 |
| port P2 | | |

-continued

| bit | explanation | start state |
|---|---|---|
| 0 | CE/ | 0 |
| 1 | IO/M | 1 |
| 2 |  | 0 |
| 3 |  | 1 |
| 4 | ORDY | 1 |
| 5 | C2 | 1 |
| 6 | C1 | 1 |
| 7 | C0 | 1 |

The PA- and PB-ports of the RAM-circuit are defined as inputs and the PC-port as an output. Through the PC-port the ORDY/-signal is passivated. The STACT/-signal is set to one, the RELA-signal is used in the one state, whereby an eventually reserved address line will be vacant. The STBY-signal is set to one and the PREQ-signal to zero.

The inside mode word of the classification unit is located in memory R7. The contents of the register and the start state are as follows

| bit | explanation | start state |
|---|---|---|
| 0 | no stone in previous sweep | 0 |
| 1 | classification ready | 0 |
| 2 | overflow of maximum stone length | 0 |
| 3 | learn mode | 0 |
| 4 | small stone | 0 |
| 5 | RF0, the processor inactive | 1 |
| 6 | mistake in writing | 0 |
| 7 | — | 0 |

The inside flags of the processor F0 (the classification unit in waiting mode) and F1 (measuring data understood) are set to one. OFFH is loaded into the inside counter of the processor and the counter is started. The SWEEP ON-signal is connected to the test separate input T1, so it will cause a timer interrupt at the end of the sweep. After the initialization, the interrupts are allowed, and the program is transferred into a WAIT-loop to wait for an interrupt.

INTERRUPTS

The classification unit has two outside possibilities for interrupts: INT/ and the T1-signal. The T1-signal is used in connection with the counter to interrupt at the end of the sweep. To the INT/-input there are functionally connected two different interrupts: the data of the analyzer is in First In, First Out register and the command interrupt of the main Processor.

The INT/-interrupt can be caused by the following signals
ORDY
HAOK
ATTN * C2

Figure 9:
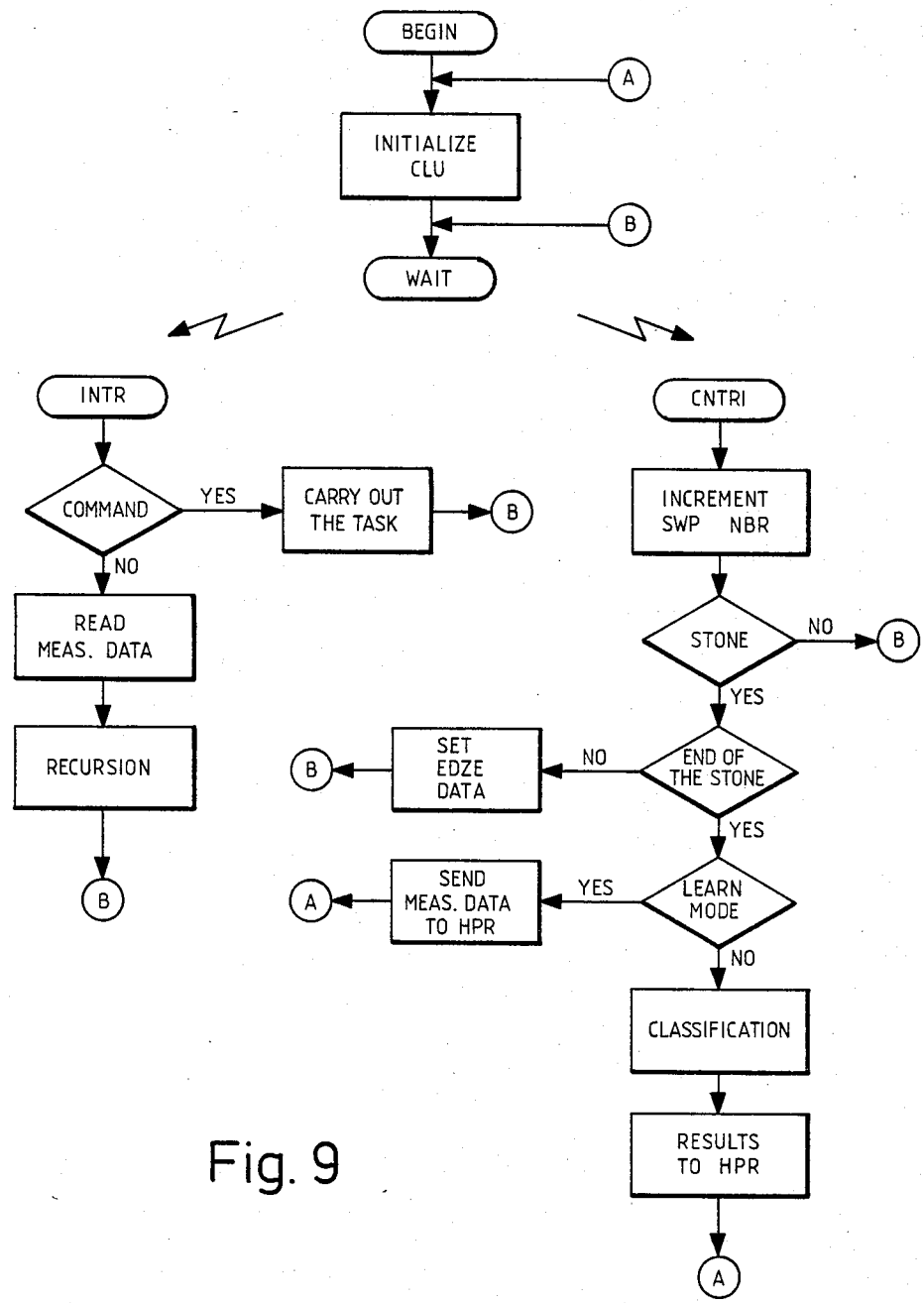
FIG. 9 is an operating diagram of the software of the classification unit.

The interrupt causes a jump to the INTR-routine (FIG. 9). If ORDY=1, when the interrupt routine is reached, i.e. the data is ready in the measuring FIFO, the data is read into the measure data registers using the SHIFT OUT (SO)-signal. When the data is read, the ORDY-flipflop is zeroed, the STACT/(stoneprocessor active) is set to zero. The STBY-signal and the F1-flag are zeroed and in the condition register the bit 0 is zeroed, i.e. "no stone in previous sweep". Returning from the interrupt routine, the zeroing of the F1 causes the handling of the measuring datas in the routine RECUR. At the end of this, F1 and STBY are set to one, and a return is made to the WAIT-loop.

If ORDY=0 when the interrupt routine is reached, the command given by the main processor defined by the C0-, C1- and C2-signals is carried out. The definitions of the commands are as follows:

| C2 | C1 | C0 | routine | task |
|---|---|---|---|---|
| 0 | 0 | 0 | RESRV | reserve databus |
| 0 | 0 | 1 | RESRV | free |
| 0 | 1 | 0 | RESRV | free |
| 0 | 1 | 1 | WRES | print the results |
| 1 | 0 | 0 | ZSWNBR | zero the sweep number |
| 1 | 0 | 1 | MESSG | read the message |
| 1 | 1 | 0 | RSTRT | start reading data |
| 1 | 1 | 1 | RDATA | read a data byte |

The meanings of the commands are as follows:
RESV: "reverse an address bus"
   The classification unit reservs the address bus on a command from the main processor. For how long it will be reserved depends on the constant loaded in the register R0. The code bytes 001 and 010 can be used for defining a new command
WRES: "write the results"
   The classification unit writes in the sort or learn mode the measuring results as five bytes in that way, that the first byte contains the mode word and the four next ones the data. The opening of the buffers and the writing into the data buses is not allowed until the main processor has set the HRDY-signal to a one. The signal is coupled to a test input. When the results have been written, the stone processor is initialized.
ZSWNBR: "zero the sweep number"
   In the register SWNBR (R22) there is saved the actual value of the the sweep number, which is used for calculating the place of the centre of gravity of the stone. In every interrupt caused by the end of a sweep, this number is incremented by one. With the command in question, the main processor confirms, that all the stone processors have the same sweep number by sending it at fixed time intervals.
MESSG: "read a message"
   By means of the message codes, extra activities can be defined for the classifiction unit to carry out. The message code 01H tells the classification unit, that the system is set to the learn mode. When the classification unit gets the mentioned message, the classification unit sets bit 3 ("learn mode") of the mode word to a one.
RSTRT: "start the reading of data"
   This command tells the classification unit how many data bytes will be written.
RDATA: "read a data byte"
   One data byte is written for the classification unit. The data byte is saved in a place reserved for it.

The commands, in which C2=0, are meant only for that classification unit, the address of which is on the data buses at the same time, when ATTN=1 and C2=0. When ATTN=C2=1, the command is meant to, and causes an interrupt for all the classification units.

The T1-input (SWEEP ON) and the counter are used to interrupt at the end of a sweep. In the interrupt handling routine CNTRI the sweep number is incremented (FIG. 9). If F0=0, the classification unit does not have a stone under work, and a return is made directly from the routine. If the processor is active (F0=1), the bits of the mode word (R7) are tested. If there was not any stone at the previous sweep (bit 0=1), or the length of the stone is more than 255 sweep intervals (bit 2=1), the stone is assumed to be finished, and a jump is made to the sort routine SORT. If the stone is a new one (bit 0=2=0, bit 5=1), the sweep number of the front edge of the stone is saved. As a mark for having handled the stone, the bit 0 is set to a 1 in the state register.

The SORT-routine first tests, whether it is a matter of sort or learn mode. In the sort mode a jump is made to the classification routine CLASS. In the case of the learn mode, on the other hand, the measured characteristic vector is sent to the main processor.

In the recognizing logic of the stone, the counter in the RAM-circuit 8155 is used. The counter counts the number of the clock pulses during one sweep. Betweeen the sweeps, the coordinate of the front edge of the stone is first loaded in the counter. The mode of the counter is defined to 2, in which the counter gives one pulse when it reaches the given value. The command of the circuit and to the mode register is given a start command. Before the length of the stone can be loaded in the register of the counter, it has to be given one clock pulse. This is made by means of the TPULSE-signal. When the counter has reached the front edge of the stone, it gives a pulse and starts to calculate the length of the stone. When it reaches the rear edge of the stone, it gives another pulse. These pulses control the recognizing logic of the stone.

CHARACTERISTIC RECURSION

After reading the measuring data of the analyzer, the routine RECUR handles recursively the measuring data. The analyzer could be connected for instance to the following three characteristic cards: minimum value, mean value, and peak value. Thus, from the analyzer and from the corresponding FIFO of the classification unit the following measuring vectors are received:
 the x-coordinate of the front edge
 the x-coordinate of the rear edge
 the minimum value
 the mean value
 the peak value The data is read in the registers R16–R20. The characteristic values are read in an order, in which the corresponding cards are connected to the analyzer rack, i.e., the program supposes that the cards are on their right places. First, the routine RECUR updates recursively the centre of gravity of the stone in the direction of the x-coordinate, and the length of the stone in the direction of the y-coordinate. The x-coordinate is received from the formula:

$$X(I) = X(I-1) + (X(F) + X(B))/2$$

where
 $X(F)$ = the coordinate of the front edge of the stone
 $X(B)$ = the coordinate of the rear edge of the stone
The y-length of the stone is received by incrementing the previous value by one, i.e., $$y(I) = y(I-1) + 1$$

If the y-value exceeds 255, the bit 2 of the state word is set. For the blowing (compare 2.5), the maximum length of the stone in the x-direction is calculated recursively, i.e., $$CL(I) = \max (XL(I-1), XL(I))$$

Figure 10:
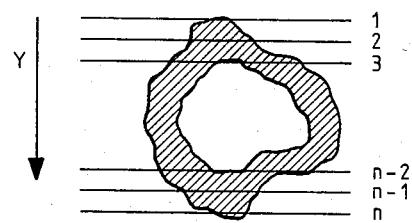
FIG. 10 illustrates the eliminating of the edges of the stone.
Figure 11:
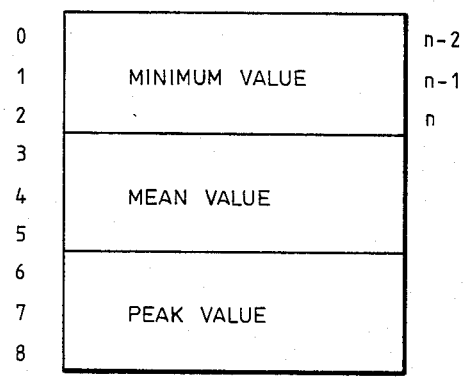

In order to remove the shadows of the edges of the stone a certain amount is cut from the edges of the stone (FIG. 10). The eliminating in the x-direction is carried out by hardware, but the eliminating in the y-direction is carried out by the RECUR-routine.

Figure 12:
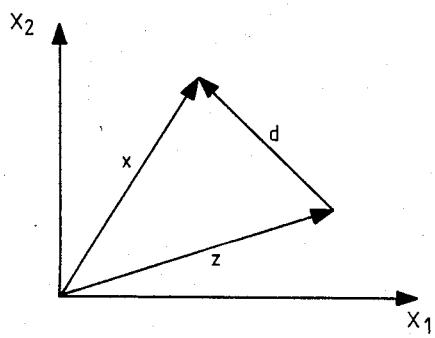
FIG. 12 shows the stack memories of the characteristics in the RAM memory.

The eliminating of the front edge of the stone is carried out simply in that way, that the characteristic recursion is started first at the third line (two lines are eliminated). The three last lines, i.e. the values of the characteristics of the characteristic recursion for these lines are to be remembered for the rear edge, because the place of the rear edge cannot be expected. Every characteristic has its own stack memory in the RAM-circuit (FIG. 12). In every recursion circle the stack is transferred one unit down and a new value is added to the top of the stack. When the rear edge is reached, the lowest value of the stack, i.e. the value of the third last line, is taken as the final characteristic value.

Now, the RECUR routine calculates the three characteristic recursions: the minimum value, the mean value and the peak value. The formulas of these recursions are $$MIN (X(1)) = \min (X(1), MIN (X(I-1)))$$

$$MEAN(X(1)) = (X(I) + MEAN(X(I-1))/2$$

$$PEAK(X(1)) = \max (X(I), PEAK(X(I)))$$

If to the RECUR routine is added new characteristics, the exact processing time is always to be calculated so, that the recursion can be carried out in the very worst case during one sweep period.

CLASSIFICATION

When the stone has passed the field of the picture, a jump is made to the classification unit, which classifies the stone with regard to the characteristic vector. The minimum distance classifier, which also is known as the nearest neighbour classifier, acts as a classification algorithm. The algorithm can be approximated in that way, that the programming of it needs only addition and subtraction, and that is why it is very suitable for being programmed in a microprocessor.

Figure 13:
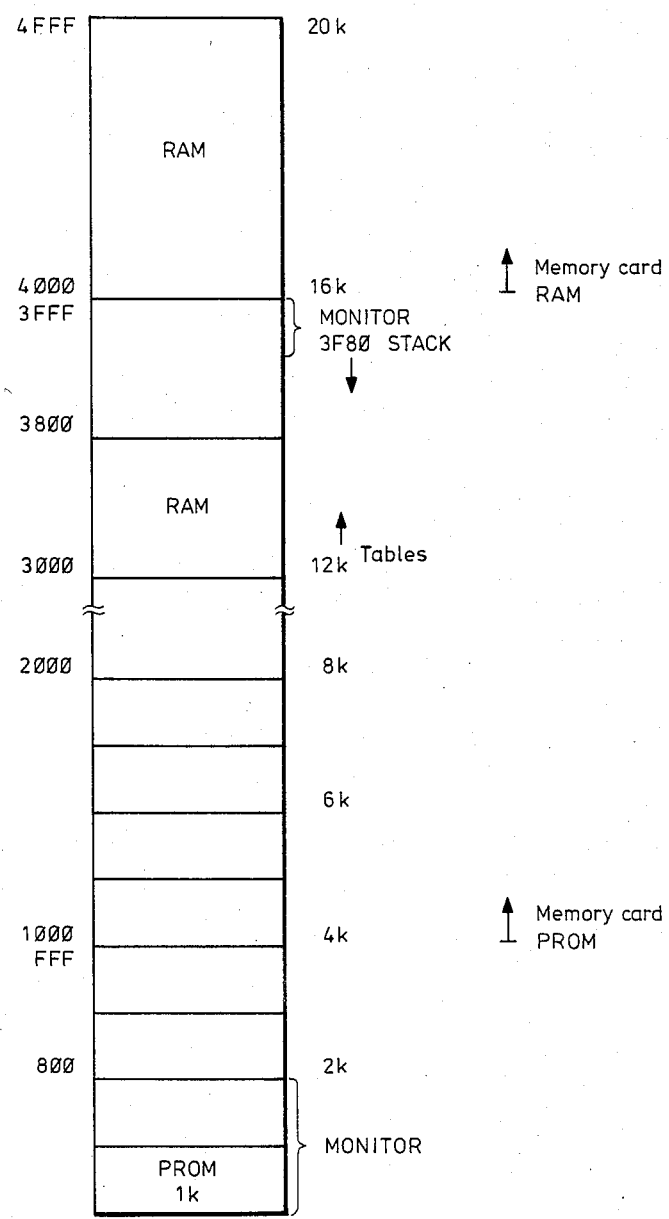
FIG. 13 illustrates the random access memory and the programable read only memory.

For simplicity, let us think about a two dimensional characteristic space $(x_1, x_2)$ (FIG. 13). According to the picture $$\bar{x} = \bar{z} + \bar{d}$$

i.e.

$$\bar{d} = \bar{x} - \bar{z}$$

As an absolute value for the distance vector is received $$|d|^2 = \sqrt{(x_1 - z_1)^2 + (x_2 - z_2)^2}$$

$$|d| = \sqrt{\sum_{i=1}^{n} (x_i - z_i)^2}$$

By quadrating both halves we receive $$|d|^2 = \sum_{i=1}^{n} (x_i - z_i)^2$$

By dropping the exponentials, an approximation for the characteristic value of the objects distance is received.

$$d_j = \sum_{i=1}^{n} (x_i - z_{ij})$$

As a matter of fact, the formula is the length of the path between the vectors parallell to the coordinate axis. The object is now regarded to belong to that class, to which the measured distance from it is the shortest one, i.e.

$$X \in C_k\ K: d_k = \min_j (d_j)$$

The shown classification algorithm needs only little memory space, and it is very fast.

What is claimed is:

1. A method for the identification and classification, on the basis of a physical property, of randomly distributed pieces of piece goods in a state of translatory movement, which comprises:
    observing the travel path of the piece goods with a detector scanning the path transversally and generating with said detector electric signals indicative of the observed physical quantity at each spot of the scanning line,
    converting said electric signals continuously in real time by means of a line analyser into binary key number groups belonging individually to each particular piece in the scanning line of the detector,
    transferring, under control by a main processor, the key number groups recursively to a plurality of classification units, each classification unit being assigned by the main processor to each particular piece during the passage past the detector, in order to carry out the classification on the basis of the key number groups, and, upon completion of the passage of the piece, said main processor resetting the corresponding classifying unit to perform the classification of a new object having arrived into the scanning line of the detector and being randomly situated therein, said main processor controlling said detector and said classification units.

2. A method according to claim 1, wherein the analog electric signals from the detector are converted by said line analyser into binary key number groups describing each particular piece in the scanning line of the detector, wherein N binary key numbers, represent marginal positions, maximum intensity, mean values, variance values or other suitable characteristics descriptive of a physical property of the piece on the line.

3. A method according to claim 1, wherein upon forming the key number groups, said groups are immediately transferred ot the classifying unit nominated for the particular piece during its passage past the detector.

4. A method according to claim 1, further comprising: passing a preselected known batch of reference objects before the detector and computing, with the aid of the main processor, and on the basis of the statistical data obtained from the properties of the reference objects, those classifying criteria according to which the classification is to take place and transferring said classification criteria to a memory of each classifying unit.

5. A method according to claim 2, further comprising: passing a preselected known batch of reference objects before the detector and computing, with the aid of the main processor and on the basis of the statistical data obtained from the properties of the reference objects, those classifying criteria according to which the classification is to take place and transferring said classification criteria to a memory of each classifying unit.

6. A method according to claim 3, further comprising: passing a preselected known batch of reference objects before the detector and computing, with the aid of the main processor and on the basis of the statistical data obtained from the properties of the reference objects, those classifying criteria according to which the classification is to take place and transferring said classification criteria to a memory of each classifying unit.

7. An apparatus for the identification and classification, on the basis of a physical property, of randomly distributed pieces of piece goods in a state of translatory movement, said apparatus comprising:
    a detector scanning the travel path of the piece goods and indicating the physical property wanted as a basis for classification, said detector generating an electric signal corresponding to the observed physical quantity,
    an analyser for forming on the basis of the signal from the detector, continuously and in real time, a binary key number group for each particular piece in the scanning line, and for converting the signal into a suitable binary form, a main processor receiving binary key number groups and performing the separation of the piece goods on the basis thereof, a number of classifying units, each incorporating a microprocessor and each processing a key number group belonging to a particular piece during the passage thereof, said main processor further receiving data from the various classifying units and resetting said classifying units for the classification of a new object situated arbitrarily in the travel path, immediately upon said classifying units having carried out the classification of the previous object.

8. An apparatus according to claim 7, wherein the analyser is adapted to form for each particular object a key number group comprising N key numbers, the said key numbers being representative of wanted features of the piece, particularly its margin positions or its maximum value, mean values, variance or other corresponding values of the intensity of the measured physical property.

9. A method for the identification and classification, on the basis of a physical property, of pieces which are randomly distributed without touching one another and in a state of continuous translatory movement on a background having an intensity of the physical property which is sufficiently different from that of the pieces being identified to enable the margins of the pieces to be identified, wherein the travel path of the pieces is observed with a detector which scans the path transversely and delivers an analog electric signal proportional to the observed physical quantity at each spot of the scan line as determined by the resolution of the detector, said analog electric signal being converted to digital form and being processed continuously in real time by an analyzer, a plurality of microprocessors, and a main processor, said method comprising the steps of:
    forming in the analyzer for each successive piece encountered on a scan line, a key number group which comprises a plurality of binary key numbers representative of selected classification characteristics, said characteristics being chosen in advance on the basis of said physical property;

processing recursively in real time, in a respective microprocessor, the digital classification characteristics for each piece during its passage through the scan line of the detector, each microprocessor being assigned to a particular piece for the duration of the passage and independently of the position of the piece;

classifying each article upon completion of its passage by comparing the binary key numbers obtained in the microprocessor assigned to that piece with classification criteria stored in the memory of the same microprocessor and delivering the result of classification to the main processor for further processing, said criteria being delivered by the main processor to each microprocessor;

and resetting each said microprocessor upon completion of the passage and the completion of the classification in real time of the piece to which it is assigned, each microprocessor then being ready, under control of the main processor, for re-assignment to perform the classification of a new, randomly located piece having arrived in the scan line of the detector.

10. Apparatus for the identification and classification, on the basis of a physical property, of pieces which are randomly distributed without touching one another and in a state of continuous translatory movement on a background having an intensity of the physical property which is sufficiently different from that of the pieces being identified to enable the perimeters of the pieces to be identified, the said apparatus comprising:

a detector scanning transversely the travel path of the pieces and generating a variable electric signal corresponding to the observed physical quantity;

an analyzer for converting the said variable electric signal into a key number group for each piece on the scan line of the detector, each said key number group comprising N key numbers being representative of the marginal positions of that piece on the scan line and other selected characteristics of the piece; a plurality of microprocessors for carrying out the classifying of the pieces on the basis of said N key numbers;

each of which microprocessors is connected for carrying out the classifying operation as a recursive processing of the information on a particular one of the pieces being classified;

and a main processor for receiving data from the said microprocessors and to control said microprocessors in such a manner that, immediately upon having carried out the classification of one said piece, each microprocessor is reset and subsequently assigned for the classification of a further piece arriving at the scan line and situated arbitrarily in the travel path across the scan line.

* * * * *